United States Patent [19]

Gonzales et al.

[11] Patent Number: 5,001,559
[45] Date of Patent: Mar. 19, 1991

[54] TRANSFORM CODING USING COEFFICIENT PREDICTION TECHNIQUES

[75] Inventors: Cesar A. Gonzales, Mahopac; Thomas McCarthy, Peekskill, both of N.Y.

[73] Assignee: International Business Machines Corporation, Armonk, N.Y.

[21] Appl. No.: 420,783

[22] Filed: Oct. 12, 1989

[51] Int. Cl.$^5$ .............................................. H04N 7/12
[52] U.S. Cl. ..................................... 358/133; 358/135
[58] Field of Search ............... 358/133, 135, 136, 430; 364/725

[56] References Cited

U.S. PATENT DOCUMENTS 4,707,738 11/1987 Ferre et al. ........................ 358/135
4,725,885 2/1988 Gonzales et al. ................... 358/135

OTHER PUBLICATIONS

"Prediction of AC Coefficients from the DC Values" *International Organization for Standardization* May '88; Niss *IBM Journal of R and D;* vol. 32, #6; pp. 717-795; Nov. '88.

*Advances in Picture Coding;* Musmann et al., IEEE Proceedings, vol. 73, #4; Apr. '85; pp. 523-548.

*Primary Examiner*—Victor R. Kostak
*Attorney, Agent, or Firm*—Thomas P. Dowd

[57] ABSTRACT

A system and method for improving the quality of decoded images, without any cost to compression efficiency, in both progressive still frame and motion video applications wherein the images are coded with intraframe transform based coding techniques, such as Discrete Cosine Transform (DCT) coding. Prediction of the AC components is utilized and operations are performed on the AC coefficient prediction in the decoder portions of the system in combination with a thresholding technique. Input images are subdivided into blocks of pixels, which are changed into blocks of coefficients by forward transform coding resulting in DC coefficients, representative of the average value in a block of pixels, and AC coefficients, representative of harmonic frequencies from the block, whereupon the predicted coefficient values are thresholded and the thresholded coefficient values are added to their corresponding transform coefficient values for the given block. These steps are repeated for all of the blocks of the image and the image representation is recovered by applying an inverse transform operation to the results of all of the additions for all of the blocks of the image.

18 Claims, 10 Drawing Sheets

TRANSFORM CODING USING COEFFICIENT PREDICTION TECHNIQUES

BACKGROUND OF THE INVENTION

1. Field of the Invention

The present invention relates to electronic image handling and more particularly to a system and method for operating on image data that has been transform coded, e.g., motion video data, using coefficient prediction techniques, to optimally recover the coded image while facilitating efficient compression of the video data.

2. Prior Art and Problems Solved

Efficient motion video compression systems typically use a combination of intraframe and interframe coding techniques. In intraframe coding a video frame (or field) of a sequence is coded without reference to any other frame (or field) in the video sequence. In interframe coding a video frame is coded by referencing one adjacent, previously coded frame. Since the typical information content of consecutive video frames changes very little, compression of frame differences, and thus interframe coding, is typically more efficient than intraframe coding. Efficiency can be further improved by applying well-known frame to frame motion compensation techniques to the basic interframe coding, as described for instance by H. MUSSMANN, P. PIRSCH, and H. GRALLERT, in "Advances in Picture Coding", Proc. IEEE, 73, 523, 1985. It is thus desirable to use interframe coding as much as possible to optimize compression rate in video sequences, but, nevertheless, intraframe coding cannot be avoided.

Intraframe coding is particularly necessary to handle scene changes and also to meet certain proposed requirements arising from recent standards efforts for motion video compression. Regarding these standards requirements, it appears that if certain proposals are adopted, it will be necessary to be able to access any video frame in a sequence within certain time limits, and to be able to playback a prerecorded video sequence in fast forward and fast reverse by accessing and skipping frames with a certain periodicity. Such requirements call for at least the periodic use of intraframe coding. For example, a fast forward mode at 10 times the normal speed would require accessing, decompressing, and displaying a video frame every 10 frames in the sequence. Since interframe coded frames need to refer to adjacent, previously decoded frames, they cannot be used to implement this function. Only intraframe coded frames can be decoded independently of others and thus a fast forward function at 10 times the normal speed requires an intraframe coded frame for every 10 frames. It follows that the length of time required to randomly access any frame in the video sequence will be constrained by the maximum number of frames between intraframe breaks. Unfortunately, the frequent recurrence of intraframe breaks degrades the quality of the image sequence that would be otherwise achievable. Intraframe transform coded frames, in particular, can show very annoying blocking artifacts at low bit rates. These artifacts are particularly noticeable in smooth areas of the image and they appear as a periodic flashing of blocks which the interframe coding then gradually tends to correct.

Referring to the commonly-applied transform coding technique, it can be adapted for use with either the intraframe or interframe mode. In transform coding, particularly Discrete Cosine Transform Coding (DCT), an image is typically subdivided into blocks of, e.g., 8×8 pixels, each of which is then transformed through mathematical operations into a new representation of the original block of pixels. The "pixels" in the transformed blocks are called transform components or coefficients. Known examples of transform operations are the DCT, Haar, Hadamard, and lapped overlap transforms. In all cases, the transform operation has the property of compacting the energy of the original pixel blocks into a few transform components, such that only those coefficients need to be quantized, compressed, and transmitted. When the transform components are quantized coarsely, which is the case with high compression rates typical of motion video standards, this block structure introduces "blocking" artifacts.

Figure 1A:
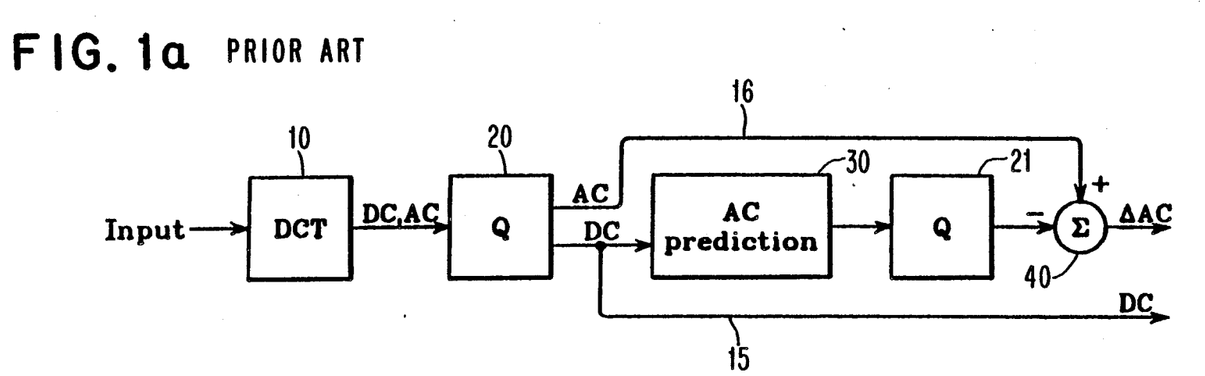
FIG. 1a is a block diagram illustrating a progressive still frame DCT encoder in accordance with the prior art.
Figure 1B:
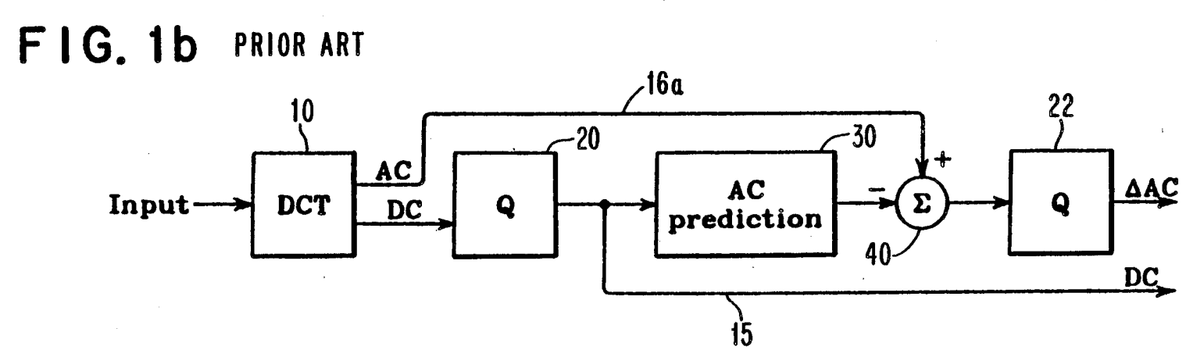
FIG. 1b is a block diagram as in FIG. 1a illustrating an alternative progressive still frame DCT encoder in accordance with the prior art.

A technique is described by B. NISS in "Prediction of AC coefficients from the DC values", ISO/TC97/SC2/WG8 N745, May 1988, and "Prediction of AC coefficients from the DC values revisited", JPEG 147, ISO/TC97/SC2/WG8 document, June 1988, for improving the quality of a still frame that is coded using a progressive transmission DCT technique. Two versions of progressive still frame DCT encoders according to NISS's proposal are shown in FIGS. 1a and 1b, along with a decoder in FIG. 2, which Figures are taken from, MITCHELL, J., B. NISS, W. PENNEBAKER, H. POULSEN, J. VAABEN, "Report on Front-End meeting", JPEG 245, ISO/IEC JTC1/SC2/WG8 document, Jan. 23, 1989. As seen in FIGS. 1a and 1b, an input representing a block of pixels from an original or other image to be coded is firstly transformed by DCT in a transformer 10. The DCT transform of the block of pixels produces a so-called DC-coefficient signal DC and a number of AC-coefficient signals AC. The DC coefficient is representative of the average value in the original block of pixels, while the AC-coefficients represent various harmonic frequencies therein. Initially, only the DC components are quantized Q in a quantizer 20 and transmitted over line 15. Also, using the quantized DC values only, some of the AC-coefficients can be estimated or predicted in an AC predictor 30. In the prior art technique of NISS the DC values of a set of 3×3 blocks are used in predicting AC-coefficients for the center block of the 3×3 array of blocks. With those predicted AC-values, the technique was able to improve the appearance of the image compared to that generated by the DC-components alone. In NISS's progressive transmission system the difference between the quantized original AC components on line 16 and their corresponding predictions, which are quantized Q in a quantizer 21, is computed in a summer 40 and transmitted to obtain a coded version of the original image, as shown in FIG. 1a. Alternatively, as seen in FIG. 1b, the difference between the unquantized original AC components on line 16a and their corresponding predictions from the DC components may first be computed in summer 40 and then quantized Q in a quantizer 22 before being transmitted to obtain the coded image.

Figure 2:
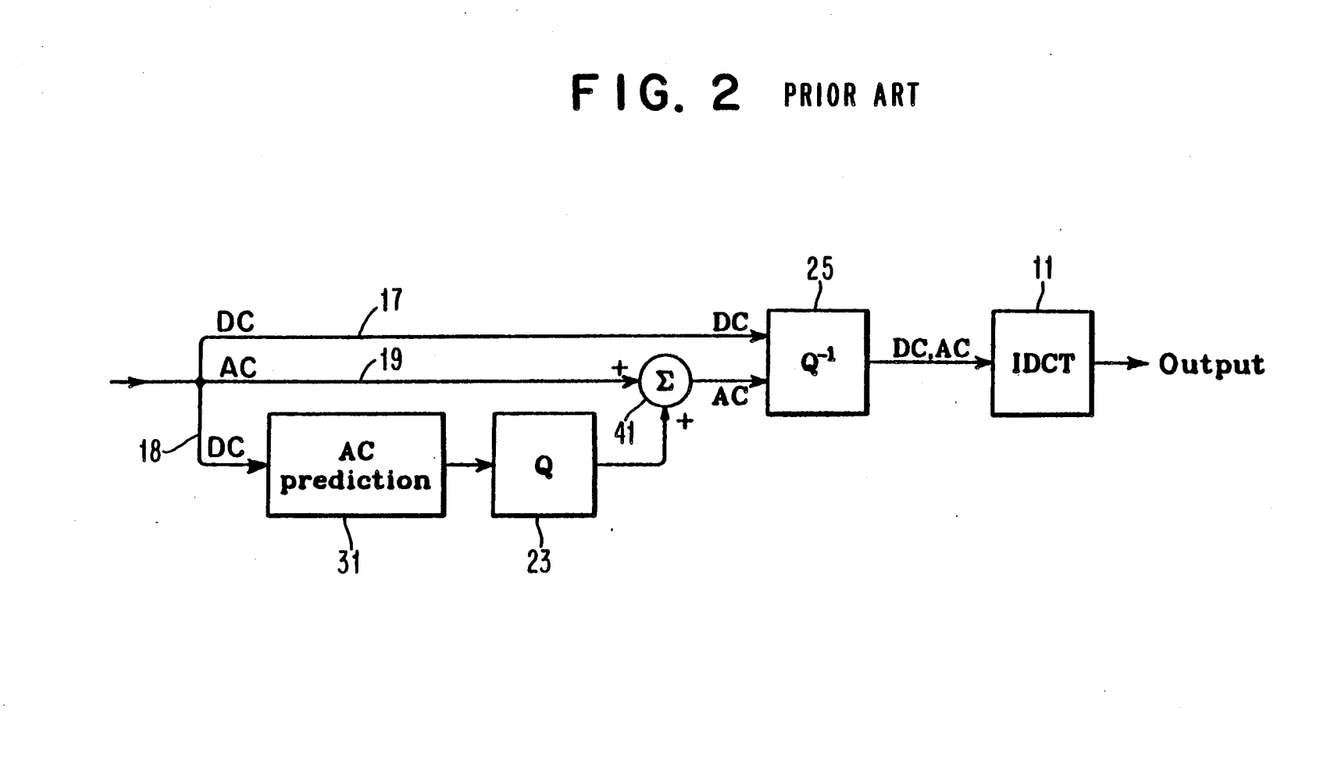

A typical decoder for use with the encoder of FIG. 1a is shown in FIG. 2. The coded and compressed signal received from the encoding transmitter is firstly decompressed and then processed as follows.

The DC component is sent over line 17 to be dequantized $Q^{-1}$ by dequantizer 25 and inverse transformed IDCT by inverse transformer 11, and also over line 18 to AC Predictor 31. The output of AC Predictor 31 is quantized Q by quantizer 23 and summed in a summer 41 with the corresponding AC coefficients from the received signal on line 19. The output of summer 41 is dequantized $Q^{-1}$ by dequantizer 25 and inverse transformed IDCT by inverse tranformer 11, and included in the decoded output with the decoded DC component.

It is important to note that in NISS's system AC-prediction is performed over the whole image regardless of whether the image contains smooth or active/complex areas. It also has no limitation on the value of the AC-predictions. Any errors in the predictions are left to be corrected later when transmission of the AC-differences is completed. Because of these features, NISS's system may introduce large prediction errors in active/complex areas of an image. These errors, in turn, can degrade compression efficiency.

Accordingly, it is desirable, and an object of the present invention, to provide a system and method for correcting the artifacts in the intraframe coded frames while achieving substantially improved image quality that would not otherwise be possible at low-bit compression rates. Additionally, and most significantly, it is desirable that this improvement be achieved with no penalty in compression efficiency. The invention solves the problem of correcting "blocking" artifacts that result with intraframe coding, while maintaining image quality and compression efficiency, by appropriately utilizing transform coding techniques.

SUMMARY OF THE INVENTION

Following from the above-described prior art, the present invention is directed to improving the results of intraframe coding of electronic images, in the form of motion video sequences or progressive still frames, and particularly, to a system and method for improving image quality in intraframe transform based coding techniques by using prediction of the AC components. The invention involves operating on the AC coefficient prediction, which operation takes place only on the decoder portions of the system in combination with a thresholding technique.

The systems to which the invention is directed essentially operate by subdividing input images into blocks of pixels. These blocks of pixels are changed into blocks of coefficients by a forward transform coding operation, and the transform coefficients include: DC coefficients, representative of the average value in a block of pixels; and AC coefficients, representative of harmonic frequencies in a block of pixels. The invention recovers a representation of an input image from the transform coefficients by taking the transform coefficients for all of the blocks of the image and beginning by generating predicted values for selected transform coefficients in a given block from the values of its transform coefficients. The selected coefficients comprise AC coefficients from the block. After generation the predicted coefficient values of said block are thresholded and the thresholded coefficient values are added to their corresponding transform coefficient values for the given block. These steps are repeated for all of the blocks of the image and the image representation is recovered by applying an inverse transform operation to the results of all of the additions for all of the blocks of the image.

Typically, the transform coefficients for the blocks will be quantized so that the predicted coefficient values are quantized before thresholding, and the results of the additions are dequantized before applying the inverse transform operation. In such event, the quantizing of the predicted coefficient values before thresholding is a finer quantization than that of the transform coefficients of the blocks. Also, scaling of the transform coefficient values of said blocks may be carried out to match the precision of the thresholded coefficient values before the addition step, whereupon compensation for the scaling is performed after applying the inverse transform operation.

Decoder embodiments for both progressive still frame and motion video applications are disclosed.

BRIEF DESCRIPTION OF THE DRAWINGS

FIG. 2 is a block diagram illustrating a DCT decoder for use in combination with the DCT encoder shown in FIG. 1a.

DETAILED DESCRIPTION OF THE INVENTION

The present invention involves a system and method for improving the intraframe coding of electronic images including various embodiments respectively capable of treating data representing either motion video sequences or still frames.

Figure 3:
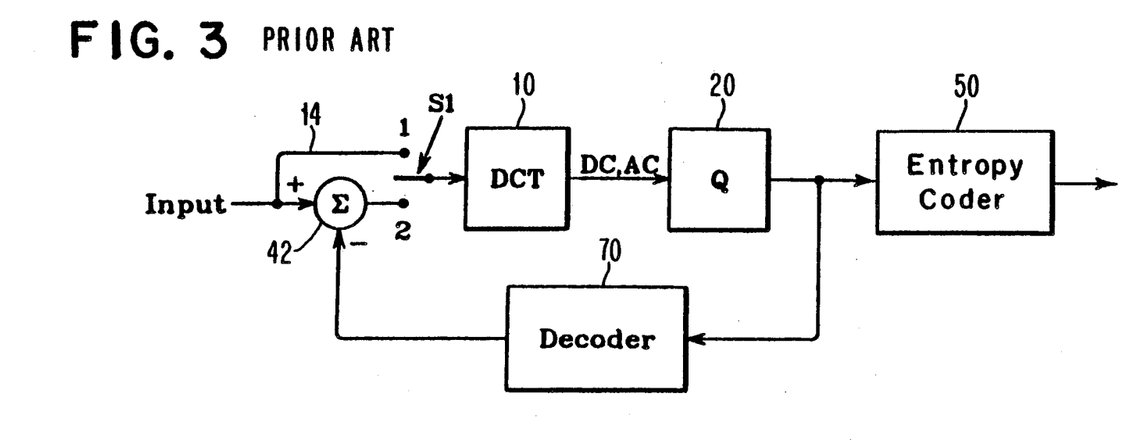
FIG. 3 is a block diagram illustrating a typical DCT motion video encoder in accordance with the prior art.
Figure 4:
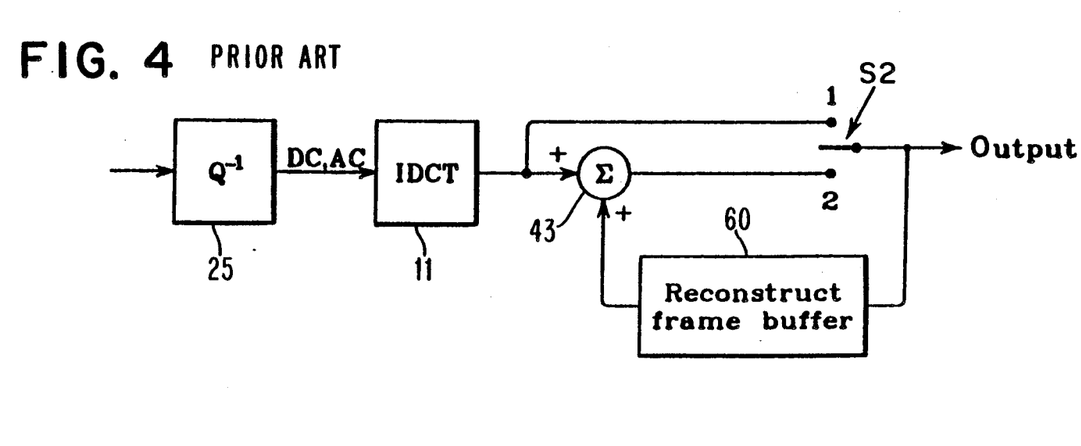
FIG. 4 is a block diagram illustrating a typical DCT motion video decoder in accordance with the prior art.

Firstly, with regard to the motion video implementation, reference is made to FIGS. 3 and 4 which show simplified diagrams of a typical prior art motion video encoder and decoder, repectively, using, e.g., the DCT, although other transforms could be used without loss of generality. The upper path of the encoder of FIG. 3, including transformer 10 and quantizer 20, is the encoder proper and will be referred to as the "transmission encoder".

For intraframe coding, switch S1 in FIG. 3 is in position 1 so that the input image data to the transmission encoder is directly operated upon by the DCT transformer 10, quantized in quantizer 20, and then transmitted. It is noted that the quantized outputs will be typically entropy coded in a coder 50, using Huffman or arithmetic coding techniques, before transmission. However, such additional operations or appropriate extensions, will be chosen by, and within the purview of, those of skill in the art and need not be discussed further here. In the decoder in FIG. 4, switch S2 is also in position 1 allowing the encoded signal to be dequantized ($Q^{-1}$) in dequantizer 25, and inversely transformed (IDCT) in inverse transformer 11, before directly output as the reconstructed image, as well as being stored in a Reconstruction frame buffer 60. The output of buffer 60 may be summed with the output of inverse transformer 11 in a summer 43.

The encoder of FIG. 3 also contains a decoder 70, such as that of FIG. 4, in its feedback loop so that the reconstructed image can be used as a prediction for the next frame by subtracting in a summer 42. Again there may be appropriate extensions to the basic coder/decoder (codec) of FIGS. 3 and 4, such as the introduction of motion compensation and filtering of the predicted frame. For interframe coding, switch S1 is in position 2 so that frame difference signals from summer 42, rather than original frame signals on line 14, are transformed and quantized by the DCT transformer 10 and the Q quantizer 20, respectively. Similarly, switch 2 of the decoder is in position 2 so that frame reconstruction is obtained by adding the reconstructed frame differences from summer 43 to the prediction (previous) frame.

As previously noted, at high compression rates, the DCT AC-components are quantized so coarsely that they are simply not detected in smooth areas of an image, thus introducing "blockiness". These artifacts are typical of block-oriented transform techniques and they cannot be easily corrected other than by the use of finer quantizers which increase the transmission bit rate or bandwidth requirements.

Prediction of AC-coefficients is one alternative to be used to correct block artifacts. The scheme shown in FIG. 1a cannot be used, however, because it assumes that the AC predictions are quantized Q with the same quantizer 20 as the original AC coefficients. Since this same quantizer was too coarse to avoid the artifacts in the first place, it does not help with the prediction either. It is possible to move the AC quantizer (21 in FIG. 1a) in the system to the position of quantizer 22 shown in FIG. 1b; but, in such case, large prediction errors may occur in active/complex areas of the image thus degrading compression efficiency. In either case the complexity of a motion video encoder incorporating the arrangements in FIG. 1a or FIG. 1b in place of the "transmission encoder" of FIG. 3, would be increased significantly, as the prediction circuitry would have to be replicated in the feedback (decoder) path.

Consequently, for intraframe coding in accordance with the present invention, the encoder may be essentially of the form of the "transmission encoder" shown in FIG. 3. However, the feedback decoder 70 will be of a form such as shown in either FIG. 5a, FIG. 5b, or FIG. 5c. It will be seen, therefore, that any increase in complexity in the system is limited to the decoder and accordingly in the encoder to the decoder path. Further, as will be seen below, there will be seen below, there will be no degradation in compression efficiency.

Figure 5A:
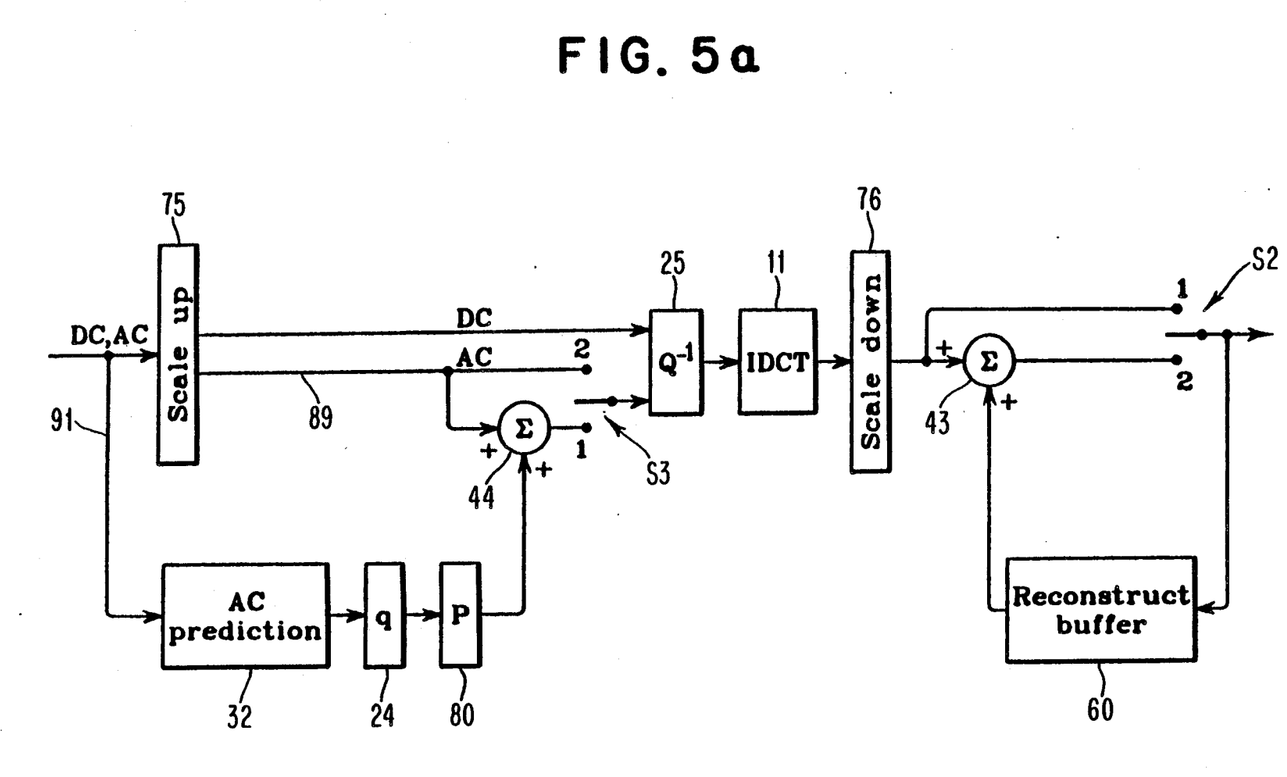
FIG. 5a is a block diagram illustrating a DCT motion video decoder in accordance with the present invention.
Figure 5B:
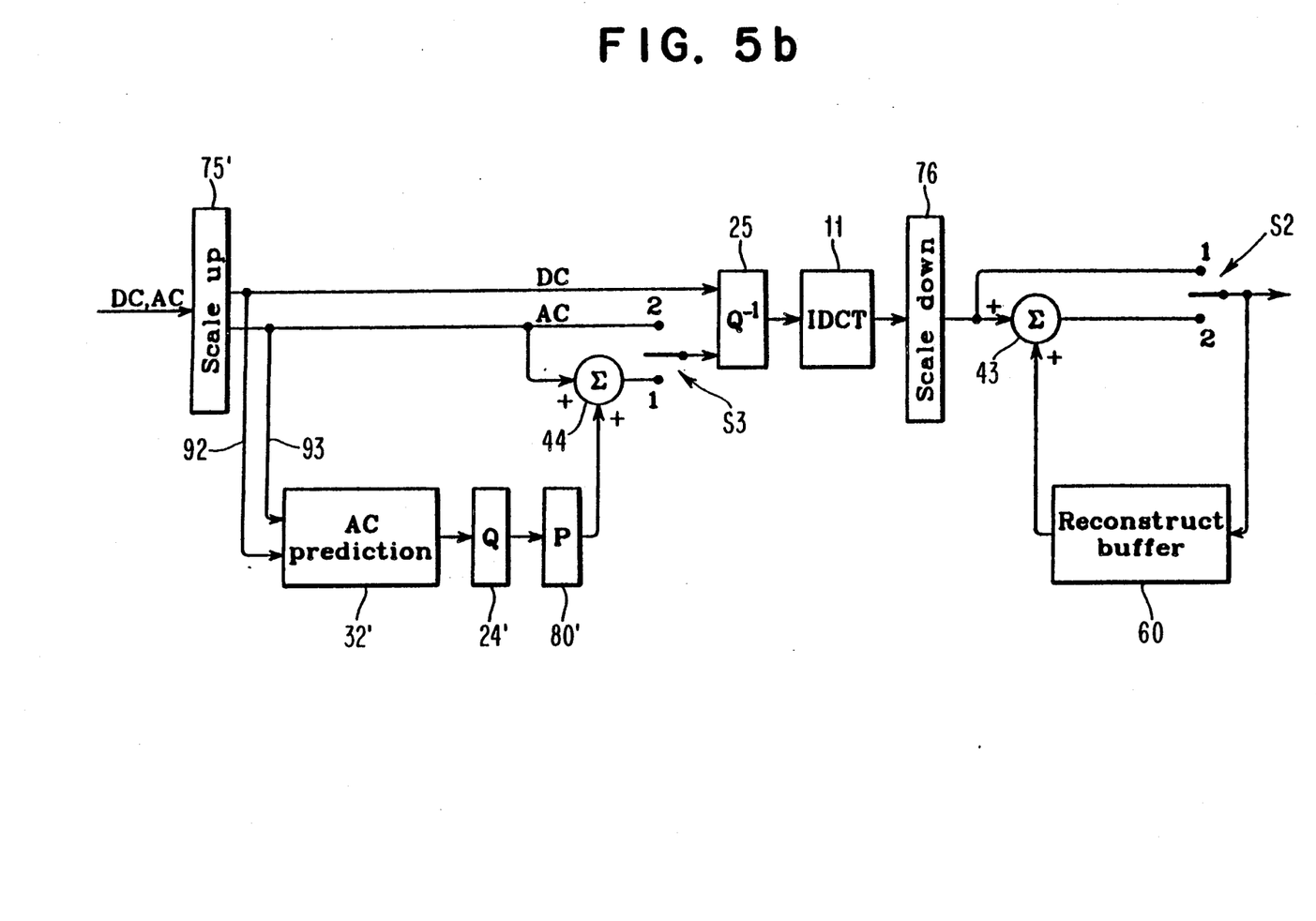
FIG. 5b is a block diagram illustrating an alternative embodiment of a DCT decoder in accordance with the present invention.
Figure 5C:
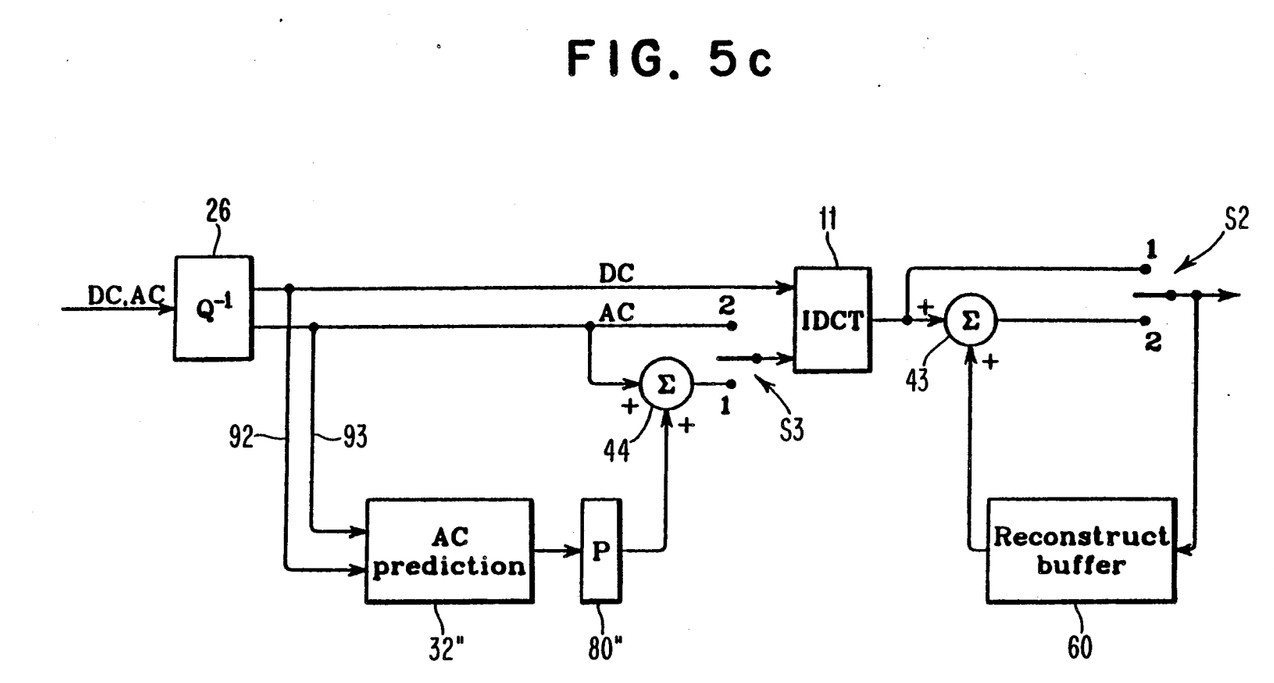
FIG. 5c is a block diagram illustrating yet another alternative embodiment of a DCT decoder in accordance with the present invention.

Turning to the decoder embodiments shown in FIGS. 5a, 5b, and 5c, all will be noted to incorporate the combination of (1) performing an AC prediction on both the DC and AC coefficient inputs, along with (2) a thresholding operation P. More particularly, in the preferred embodiment of FIG. 5a, the DC and AC coefficient inputs, before scale up at 75, are fed over line 91 to AC predictor 32. This predictor may be readily implemented by a combination of simple arithmetic operations, such as that disclosed in the MITCHELL ET AL paper cited above and the use of lookup tables. The prediction coefficients output by predictor 32 are quantized q in a fine quantizer 24, that is, one that produces a quantization q which is finer than the quantization Q of quantizer 20 in FIG. 3. The finely quantized coefficients from fine quantizer 24 are then thresholded P in a suitable thresholder 80. Thresholder 80 may be implemented by a lookup table or a comparator, as appropriate for the operating parameters. The thresholded AC coefficients output by thresholder 80 are summed with their corresponding scaled up AC coefficient inputs on line 89 in a summer 44. When switch S3 is in position 1, the output of summer 44 will be sent to the remainder of the decoder which essentially constitutes the components of the decoder of FIG. 4 with the addition of a scale down function at 76, to compensate for the earlier scale up. The scale up function on the AC coefficients in 75 does not necessarily add complexity to the system as there may be a scale up function in the dequantizer 25. The scale down function 76 may also be incorporated in the inverse transformer 11; but, in any event, appropriate scaling in these combinations will be within the purview of those of skill in the art.

The first important feature to be noted in the inventive system, which has implications on implementation complexity, is that AC prediction is done only in the decoder portions. Thus, unlike the prior art, with the invention it is not necessary to transmit the prediction difference, but rather the original AC coefficients themselves are transmitted. Prediction is only used to improve the quality of the decoded image; it has no impact on the coding rate. It has been determined experimentally that with prior art techniques, such as that of NISS, AC prediction has a greater impact on image quality than on compression efficiency. The second important feature is that unlike the decoder shown in FIG. 2, a finer quantization, q, is used for the prediction coefficients. In this manner it is possible to predict AC values which could be detected by the coarse quantization Q. In problem areas, such as flat areas of the image, the AC coefficients tend to be small so that coarse quantization Q will miss them. Thirdly, in accordance with the invention, after mapping the AC predictions through a thresholder operation, P, the predictions are added to a scaled version of the original quantized AC coefficients. It is preferred that q be a linear scaled down version of Q, e.g., q scale down=DC, AC scale up.

Figure 7:
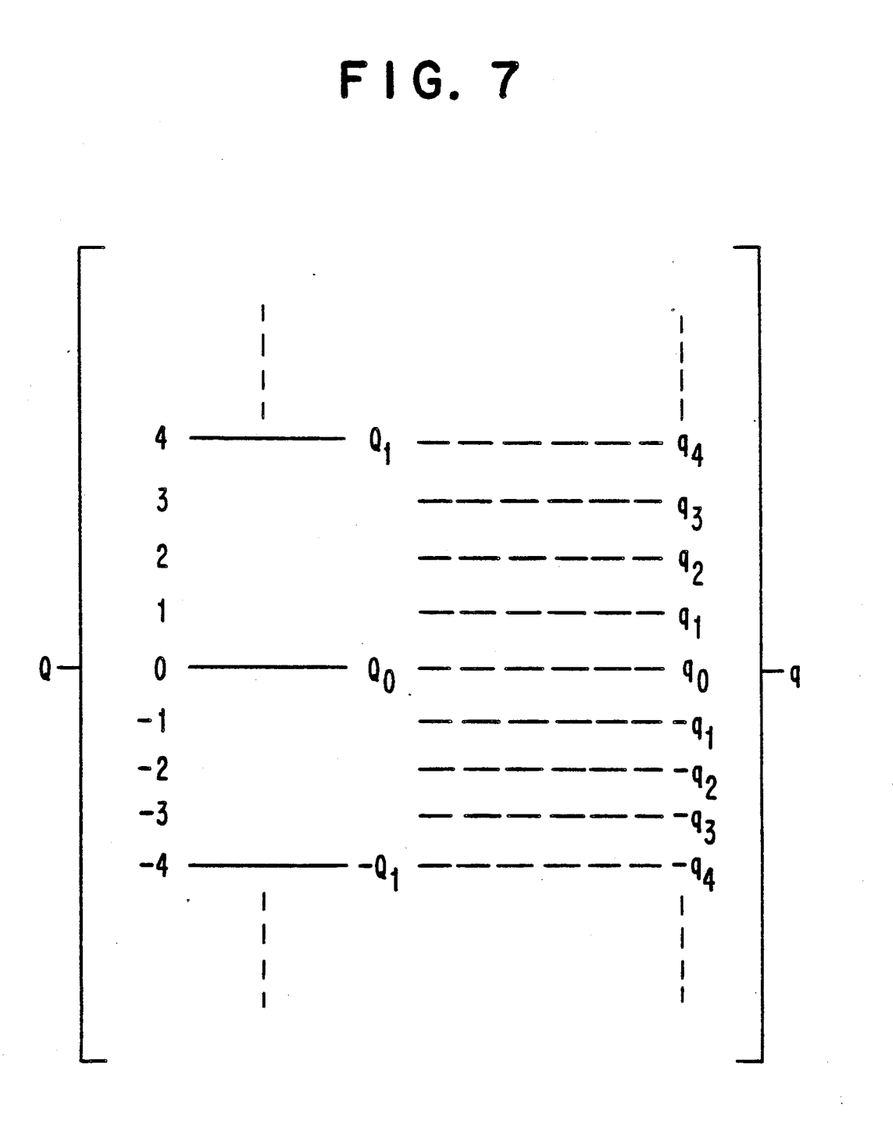
FIG. 7 is a diagrammatic representation in illustration of scaling factors used in connection with the invention.

With regard to scaling, attention is called to FIG. 7 which diagrams quantization scaling factors, wherein, for instance, a scaling factor of four is shown. It will be seen that $Q_1 = q_4$ and $q_1 = Q/4$. This same scaling factor would be applied to scale up the DC, AC components in FIG. 5a. Another important aspect of the invention is the use of thresholder P. Without proper thresholding large errors could be introduced in the AC-prediction estimates. The thresholding function P of the invention is used to insure that only AC predictions which could not be detected and quantized Q by the coarse quantizers are allowed, i.e., predicted values which can be detected by the coarse quantizers are simply set to zero. Thus, assuming that the quantizer decision levels are in between the reconstruction levels, and that anything above $Q_1/2$ would be detected by quantizer Q, the mapping generated by P forces $q_i=0$ for $q_i \geq Q_1/2$. This mapping implicitly allows the generation of AC-prediction for smooth areas of the image only. The AC predictions for active areas—where predictions would normally be large—are forced to zero. The smooth areas are thus substantially improved in quality. Since the decoder can calculate the prediction from known information, the improvement in quality comes at NO PENALTY to compression. Experiments shown a far superior image quality is obtained when the image is reconstructed in this manner as compared to the use of no AC-prediction.

Another decoder embodiment in accordance with the invention is shown in FIG. 5b, wherein scale up of the DC and AC coefficient inputs is performed at 75' prior to their being fed over respective lines 92 and 93 to AC predictor 32'. The output of predictor 32' is quantized Q in quantizer 24' and thresholded in thresholder 80' before being fed to summer 44. With this arrangement, the scale down function on the Ac prediction quantizer 24 of FIG. 5a is not needed in quantizer 24', however, greater arithmetic precision and larger lookup tables are required for implementing the prediction function in 32'. In this case, the mapping generated by P forces $q_i=0$ for $q_i \geq 2Q_1$.

A further implementation of a decoder in accordance with the invention is shown in FIG. 5c. In this embodiment, inverse quantization $Q^{-1}$ is performed by inverse quantizer 26 on the DC and AC coefficient inputs prior to their being fed over lines 92 and 93 to an AC predictor 32''. With this arrangement, dequantizer 25 and quantizers 24 and 24' of the previous embodiments may be dispensed with; but, a higher precision dequantization $Q^{-1}$ is needed, and lookup table implementation of the prediction function would require large tables so that the substitution of logical adds and multiples may be preferred.

Figure 6A:
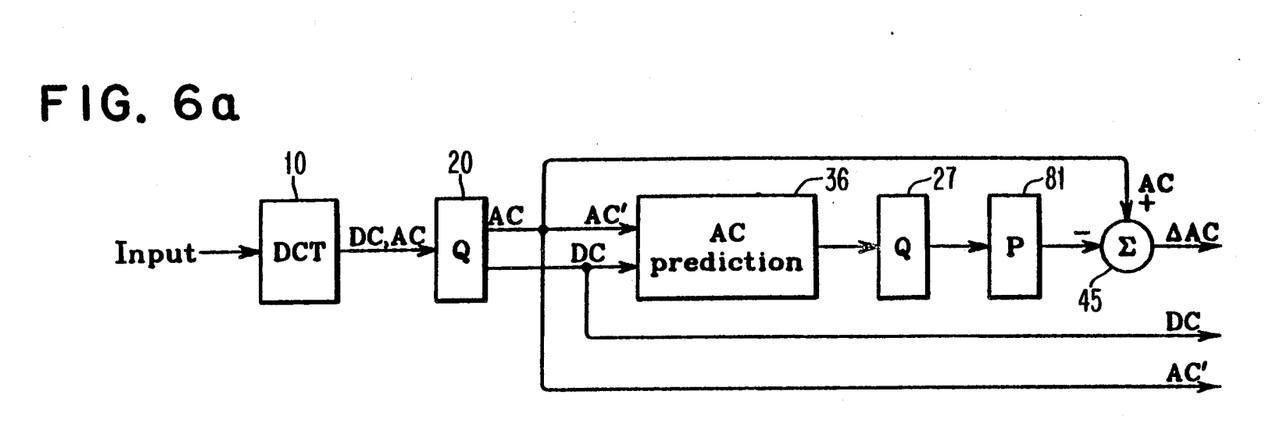
FIG. 6a is a block diagram illustrating a DCT progressive still frame encoder in accordance with the present invention.

While the invention has in the preceding embodiments been described as applied to processing motion video data, the inventive principles disclosed can be applied to the progressive transmission of still-frame images. In contrast to the AC-prediction performed by the predictor 30 on DC coefficients in the prior art still frame encoder of FIG. 1a, a still frame encoder in accordance with the invention is shown in FIG. 6a, wherein it will be seen that not only the DC-coefficients, but also a portion AC' of the AC-coefficients AC are used for prediction in a predictor 36. Aside from the differences due to the improved AC-prediction function and the addition of a thresholder 81, the other elements of the encoder shown in FIG. 6a, i.e., quantizer 27, summer 45, etc., may be essentially the same as those of the prior art encoder of FIG. 1a.

In the FIG. 6a embodiment, the portion AC' of the AC-coefficients AC constitute those portions of the coefficients that are "coarsely quantized". For example, in an 8-bit sign-magnitude representation of linearly quantized AC coefficients, AC-quantizer levels can be represented as between −127 and +127. AC' could correspond to the most significant bit (MSB) of an AC value, i.e., the first bit after the sign; with the sign bit transmitted only if the value of AC' is non-zero. In such case, AC' can only assume the values of +64, 0, or −64 and can be thought of as a requantization of AC with a linear quantizer step 64 times the original quantizer step. In the preferred embodiment of the invention, the thresholding P of thresholder 81 is controlled by the value of AC' in two different ways. Firstly, if AC'≠0, the thresholder forces the prediction to be zero (no prediction). Secondly, if AC'=0 the thresholder will allow quantized predicted values less than 63; larger values are set to zero. This threshold is chosen because a larger AC value would have been detected by the value of AC' in the first place.

For AC'=0 -in successive stages of progression- the difference between the original quantized AC values and their prediction can be transmitted. Since no sign information was transmitted with AC', the sign can be transmitted as soon as the first non-zero magitude bit of the difference is sent. For AC≠0, the remaining least significant bits (LSB) are simply transmitted.

Figure 6B:
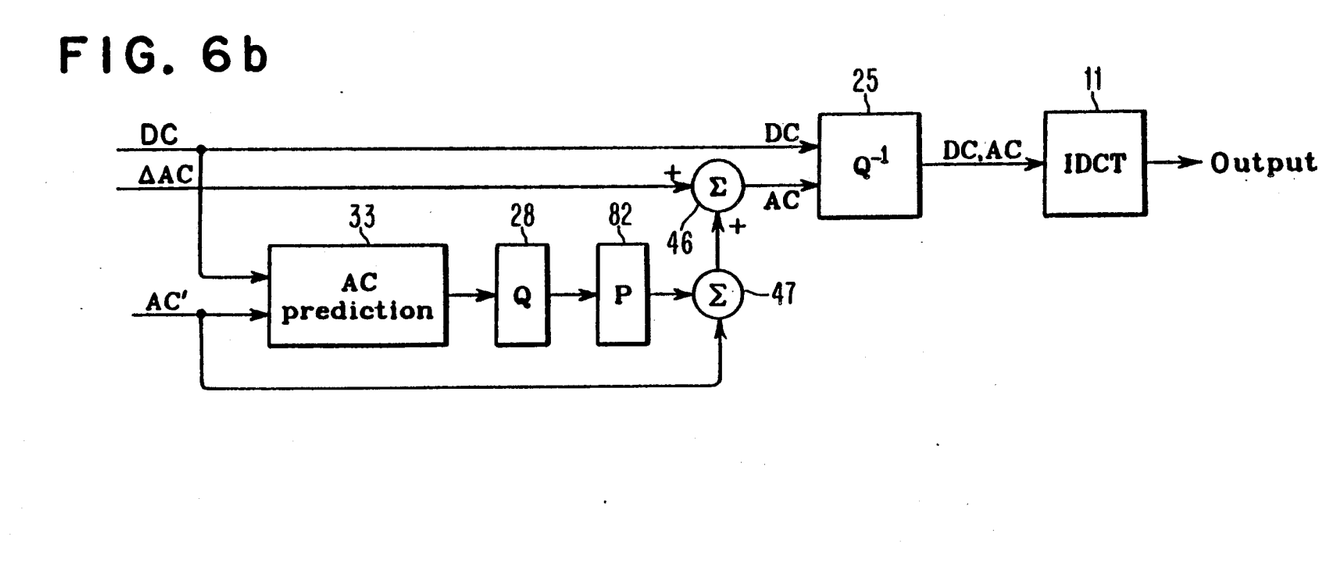
FIG. 6b is a block diagram illustrating a DCT progressive still frame decoder in accordance with the present invention.

A progressive still frame decoder according to the invention is shown in FIG. 6b. The received DC and AC' coefficients are fed to an AC predictor 33, quantized in quantizer 28, and thresholded P in thresholder 82, before being summed with ΔAC signals in summer 46. The operation of this decoder reverses the procedure of the encoder in FIG. 6a. If AC'≠0, the prediction is zero and AC' is recombined, through summers 47 and 46, with ΔAC which contains the least significant bits (LSB) information. If AC'=0, the prediction is thresholded before it gets added to the difference data transmitted in later stages of the progression.

It might be noted that in the event that the quantization is not linear in the cited embodiments, the implementation of the invention can be carried out by defining the threshold values differently.

Figure 8:
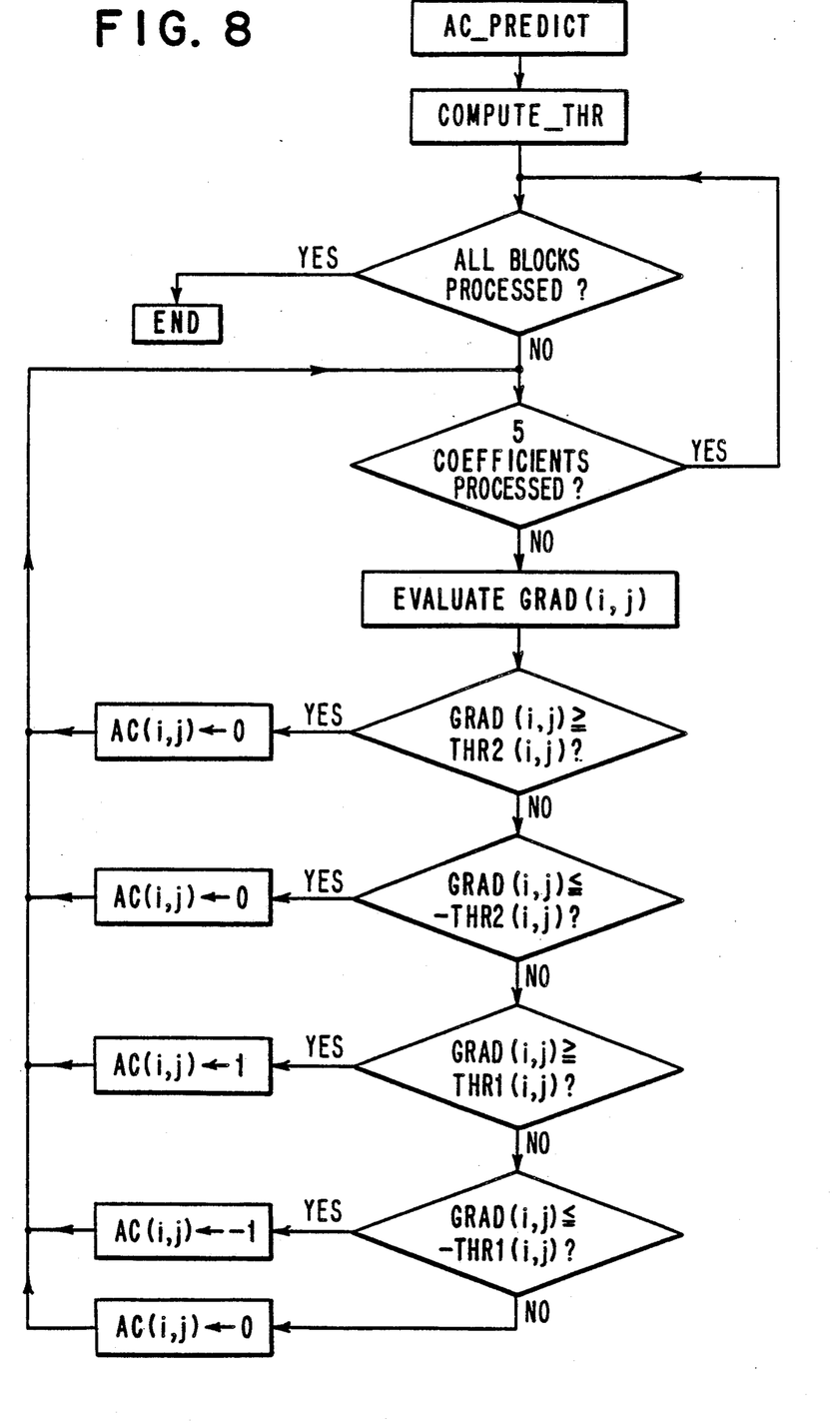
FIG. 8 is a flowchart illustrating the computation of AC predicted values using a thresholder according to the invention.
Figure 9:
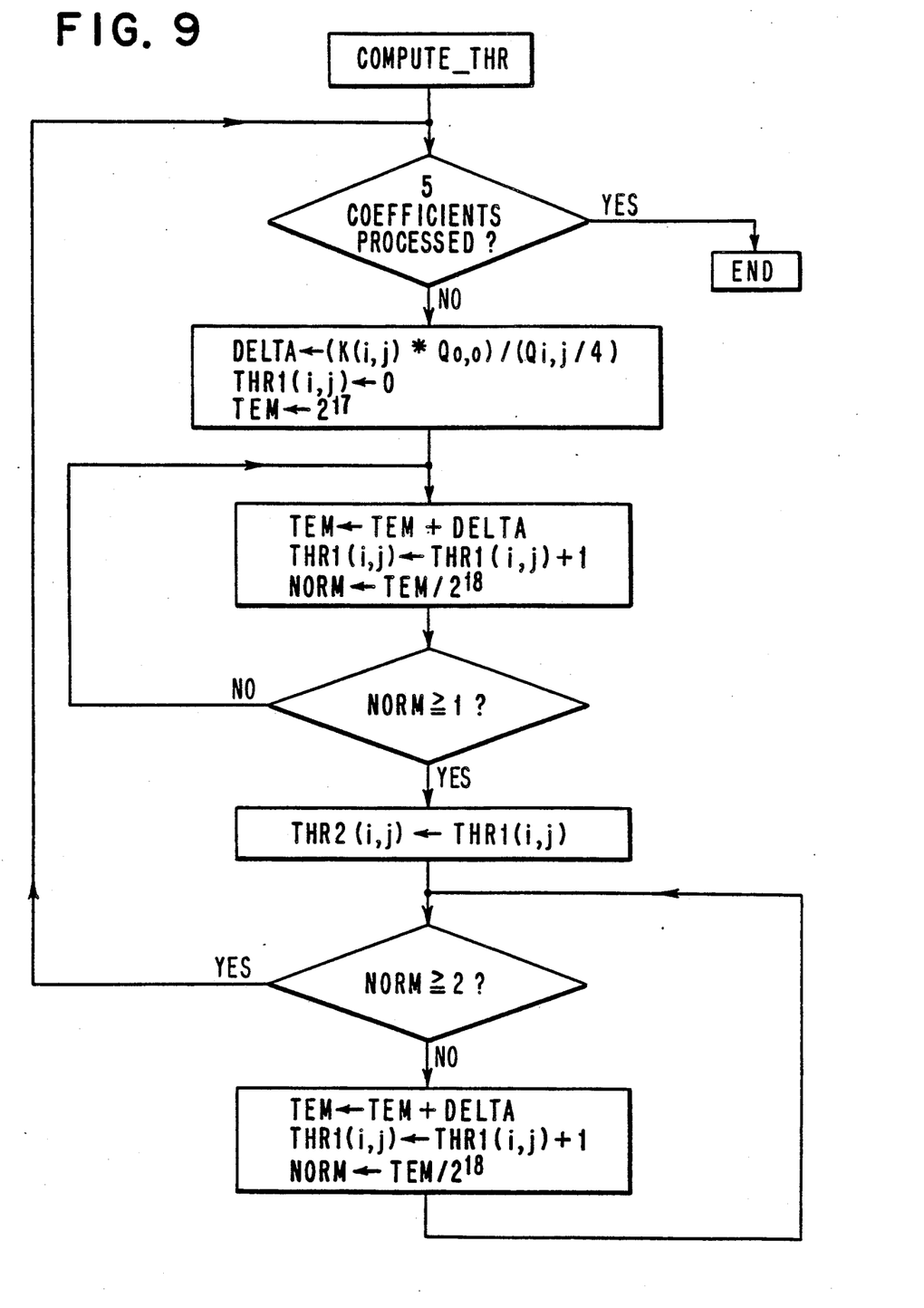
FIG. 9 is a flowchart illustrating the computation of two threshold values of the thresholder of FIG. 8 used in AC prediction.

By way of example, flowcharts are shown in FIGS. 8 and 9 of software implementations of NISS's AC prediction formulas in combination with a thresholder in accordance with the present invention. The thresholder allows quantized predicted values of −1, 0, and +1 only. Further, the predictor fine quantizer is of the form of that in FIG. 7.

AC_PREDICT: In FIG. 8, five AC coefficients are predicted. COMPUTE_THR calculates THR1 and THR2 for each coefficient. For each coefficient a quantized DC gradient is calculated according to the formulas taken from NISS and MITCHELL ET AL.

$$GRAD(0,1)=(DC_4-DC_6)$$

$$GRAD(1,0)=(DC_2-DC_8)$$

$$GRAD(2,0)=(DC_2+DC_8-2\times DC_5)$$

$$GRAD(1,1)=(DC_1+DC_9-DC_3-DC_7)$$

$$GRAD(0,2)=(DC_4+DC_6-2\times DC_5)$$

Each gradient is compared against the appropriate set of thresholds. If the absolute value of the gradient is greater or equal to THR2 or less than THR1, the prediction is zero. If $THR1(i,j) \leq GRAD(i,j) < THR2(i,j)$ the prediction is 1. If $-THR1(i,j) \geq GRAD(i,j) \geq -THR2(i,j)$ the prediction is −1. Note that the order of the questions is important since it is possible that THR1 and THR2 are equal. Also note that the gradients are obtained by using quantized DC levels. Finally note that the resulting predictions are stored in the same DCT array where AC_DECODE adds its decoded values.

COMPUTE.THR: FIG. 9 illustrates the computing of the thresholds used in AC prediction. A set of two thresholds are computed for each AC coefficient predicted. These thresholds incorporate the dequantization of the DC gradient, $Q_{0,0}$; and the reduction of the AC quantizer step, $Q_{ij}/4$ (see FIG. 7). The constants $K(i,j)$ are derived from NISS after a scale up of a factor of $2^{12}$, so as to permit integer arithmetic. For example, $K(0,1)=9.1108\times 4096$. These formulas require further normalization by $2^6=64$ so that the total normalization becomes $2^6 2^{12}=2^{18}$ The integer values of K are:

$K(0,1)=37318$ $K(1,0)=37318$ $K(2,0)=9136$ $K(1,1)=5313$ $K(0,2)=9136$

DELTA represents the unnormalized contribution of a step of one in the DC gradient to the quantized AC coefficient. THR1 counts the number of DC gradients steps needed to generate a quantized AC prediction of value 1. THR2 counts the number needed to generate a quantized AC prediction of value 2. The initial value of TEM=$2^{17}$ is used for rounding.

It will accordingly be seen that a system and method are disclosed for improving image quality in intraframe transform based coding techniques by using prediction of the AC components, which prediction takes place only in the decoder portions of the system and is combined with a thresholding function.

What is claimed is:

1. In a data compression system wherein input images are subdivided into blocks of pixels and said blocks of pixels are changed into blocks of coefficients by a forward transform coding operation, said transform coefficients including DC coefficients, representative of the average value in a block of pixels, and AC coefficients, representative of harmonic frequencies in a block of pixels, a method for recovering a representation of an input image from the transform coefficients comprising the steps of:
    (a) receiving said transform coefficients for all of said blocks of said image;
    (b) generating predicted values for selected transform coefficients in a given block from the values of received transform coefficients, wherein said selected coefficients comprise AC coefficients;
    (c) thresholding said predicted coefficient values of said block;
    (d) adding received transform coefficient values for said given block to corresponding thresholded coefficient values from step (c);
    (e) repeating each of steps (b) through (d) for all of the blocks of said image received; and
    (f) recovering said image representation by applying an inverse transform operation to the results of the addition of step (d) for all of said blocks of said image received.

2. The method of claim 1 wherein said received transform coefficients for all of said blocks have been quantized and comprising the further steps of:
    (g) quantizing said predicted coefficient values before said thresholding; and
    (h) dequantizing the results of the additions of step (d) before applying said inverse transform operation.

3. The method of claim 2 wherein said quantizing of said predicted coefficient values before said thresholding is a finer quantization than that of said received transform coefficients for all of said blocks.

4. The method of claim 1 further comprising the steps of:
    (g) scaling said received coefficient values of said blocks to match the precision of the thresholded coefficient values in step (c) before the additions in step (d); and
    (h) compensating for the scaling of step (g) after applying said inverse transform operation.

5. The method of claim 4 wherein said scaling step (g) comprises scaling up said received coefficient values of said blocks before the generating of predicted values for selected transform coefficients from the values of said received transform coefficients.

6. The method of claim 1 wherein said received transform coefficients for all of said blocks have been quantized and comprising the further step of dequantizing said received coefficient values of said blocks before the generating of predicted values for selected transform coefficients from the values of said received transform coefficients.

7. The method of claim 1 comprising the further step of applying said steps (a) through (f) in the decoder feedback loop of a transform based motion video encoder.

8. In a data compression system wherein input images are subdivided into blocks of pixels and said blocks of pixels are changed into blocks of coefficients by a forward transform coding operation, said transform coefficients including DC coefficients, representative of the average value in a block of pixels, and AC coefficients, representative of harmonic frequencies in a block of pixels, apparatus for recovering a representation of an input image from the transform coefficients comprising:
    (a) first means for receiving said transform coefficients for all of said blocks of said image;
    (b) second means, connected to said first means and responsive to said received transform coefficients, for generating predicted values for selected transform coefficients in a given block from the values of said received transform coefficients, wherein said selected coefficients comprise AC coefficients;
    (c) third means, connected to said second means, for thresholding said predicted coefficient values of said block generated by said second means;
    (d) fourth means, connected to said first and third means, for adding corresponding received transform coefficient values from said first means and threshold coefficient values from said third means;
    (e) fifth means for repeatedly reactivating said second, third, and fourth means to operate on said transform coefficients of all of the blocks of said image received; and
    (f) sixth means, connected to said fourth means, for applying an inverse transform operation to the results of the additions performed by said fourth means on all of said blocks of said image received, to recover said image representation.

9. The apparatus of claim 8 wherein said received transform coefficients for all of said blocks have been quantized and further comprising:

(g) seventh means, connected to said second means, for quantizing said predicted coefficient values before said thresholding; and (h) eighth means, connected to said fourth means, for dequantizing the results of the additions before said sixth means applies said inverse transform operation.

10. The apparatus of claim 9 wherein said seventh means performs a finer quantization than that performed on said received transform coefficients for all of said blocks.

11. The apparatus of claim 8 further comprising:

(g) seventh means, connected to said first means and said fourth means, for scaling said received coefficient values of said blocks to match the precision of the thresholded coefficient values from said third means before the additions by said fourth means; and (h) eighth means, connected to said sixth means, for compensating for the scaling of said seventh means after the application of said inverse transform operation.

12. The apparatus of claim 11 wherein said seventh means comprises means for scaling up said received coefficient values of said blocks before said second means generates the predicted values for selected transform coefficients from the values of said received transform coefficients.

13. The apparatus of claim 8 wherein said received transform coefficients for all of said blocks have been quantized and further comprising seventh means, connected to said first means for dequantizing said received coefficient values of said blocks before said second means generates the predicted values for selected transform coefficients from the values of said received transform coefficients.

14. The apparatus of claim 8 further comprising a transform based motion video encoder having a feedback loop and wherein said first through sixth means are incorporated in said encoder in said feedback loop.

15. In a progressive transmission scheme for still frame images wherein input images are subdivided into blocks of pixels, said blocks of pixels are changed into blocks of coefficients by transform coding techniques, and said coefficients are quantized and transmitted progressively, and said transmission comprises a first stage wherein the most significant bits of said coefficients in all blocks are sent, followed by successive stages wherein less significant bits of said coefficients are sent, a method for recovering a representation of an input image from the coded transmission comprising the steps of:

(a) receiving the first stage quantized coefficient bit values for all of said blocks of said image;

(b) generating a quantized predicted value for certain coefficients in a given block;

(c) thresholding said predicted coefficient bit values of said block;

(d) adding the thresholded coefficient bit values from step (c) to the corresponding quantized coefficient bit values of said block;

(e) repeating each of the foregoing steps for all of the blocks of said image received; and (f) recovering said image representation by applying an inverse transform operation to the results of the additions of step (d) for all of said blocks of said image received.

16. A method as in claim 15 further comprising the steps of:

(g) additionally receiving said less significant bit values from said successive stages for all of said blocks of said image; and (h) including said less significant bit values from said successive stages for all of said blocks of said image in said addition step (d).

17. In a progressive transmission scheme for still frame images wherein input images are subdivided into blocks of pixels, said blocks of pixels are changed into blocks of coefficients by transform coding techniques, and said coefficients are quantized and transmitted progressively, and said transmission comprises a first stage wherein the most significant bits of said coefficients in all blocks are sent, followed by successive stages wherein less significant bits of said coefficients are sent, apparatus for recovering a representation of an input image from the coded transmission comprising:

(a) means for receiving the first stage quantized coefficient bit values for all of said blocks of said image;

(b) means for generating a quantized predicted value for certain coefficients in a given block;

(c) means for thresholding said predicted coefficient bit values of said block;

(d) means for adding the thresholded coefficient bit values from step (c) to the corresponding quantized coefficient bit values of said block;

(e) means for repeating each of the foregoing steps for all of the blocks of said image received; and (f) means for recovering said image representation by applying an inverse transform operation to the results of the additions of step (d) for all of said blocks of said image received.

18. Apparatus as in claim 17 further comprising:

(g) means for additionally receiving said less significant bit values from said successive stages for all of said blocks of said image; and (h) means for including said less significant bit values from said successive stages for all of said blocks of said image in said addition step (d).

* * * * *